United States Patent [19]
Ashton

[11] Patent Number: 5,996,614
[45] Date of Patent: Dec. 7, 1999

[54] FLUID VALVE

[75] Inventor: Craig Ashton, Greer, S.C.

[73] Assignee: T&S Brass & Bronze Works, Inc., Travelers Rest, S.C.

[21] Appl. No.: 08/953,921

[22] Filed: Oct. 20, 1997

[51] Int. Cl.$^6$ .................................................. F16K 25/00
[52] U.S. Cl. .................. 137/454.6; 137/606; 137/614.2; 137/625.31
[58] Field of Search ................................. 132/606, 454.6, 132/454.5, 625.32, 625.31, 614.2

[56] References Cited

U.S. PATENT DOCUMENTS

| | | | |
|---|---|---|---|
| 941,596 | 11/1909 | White | 137/614.2 |
| 1,223,353 | 4/1917 | Angell . | |
| 2,053,931 | 9/1936 | Work | 137/614.2 |
| 2,271,419 | 1/1942 | Egan | 137/614.2 |
| 2,494,044 | 1/1950 | Jurisich et al. | 137/625.16 |
| 2,777,426 | 1/1957 | Steele | 137/614.2 |
| 2,839,247 | 6/1958 | Jorgensen | 137/614.2 |
| 4,687,002 | 8/1987 | Valley | 251/208 |
| 4,832,077 | 5/1989 | Pilolla | 137/614.2 |
| 4,901,977 | 2/1990 | Hendrick . | |
| 4,903,725 | 2/1990 | Ko . | |
| 4,924,903 | 5/1990 | Orlandi . | |
| 4,966,186 | 10/1990 | Rodstein . | |
| 5,014,736 | 5/1991 | Korfgen et al. | 251/208 |
| 5,054,521 | 10/1991 | Hendrick . | |
| 5,094,258 | 3/1992 | Orlandi . | |
| 5,107,884 | 4/1992 | Orlandi | 251/208 |
| 5,217,046 | 6/1993 | Woods | 251/208 |
| 5,236,007 | 8/1993 | Scaramucci . | |
| 5,342,025 | 8/1994 | Hwang | 251/208 |
| 5,348,045 | 9/1994 | Wagner et al. | 251/208 |
| 5,355,906 | 10/1994 | Marty et al. | 137/454.6 |
| 5,551,479 | 9/1996 | Graves . | |

FOREIGN PATENT DOCUMENTS

| | | |
|---|---|---|
| 6082280 | 7/1979 | Australia . |
| 0035056 | 9/1981 | European Pat. Off. . |
| 0423633A1 | 4/1991 | European Pat. Off. . |
| 2262998 | 6/1974 | Germany . |
| 3421653A1 | 9/1985 | Germany . |
| 29620194U1 | 3/1997 | Germany . |
| 6506697 | 12/1965 | Netherlands . |
| 1435367 | 5/1976 | United Kingdom . |
| 1440889 | 6/1976 | United Kingdom . |
| 2119900A | 11/1983 | United Kingdom . |
| 2136545A | 9/1984 | United Kingdom . |
| 2178136A | 2/1987 | United Kingdom . |
| 2266575A | 11/1993 | United Kingdom . |

OTHER PUBLICATIONS

International Search Report, Jul. 17, 1998.

*Primary Examiner*—Denise L. Ferensic
*Assistant Examiner*—Joanne Y. Kim
*Attorney, Agent, or Firm*—Dority & Manning, P.A.

[57] ABSTRACT

A fluid valve is provided including a housing having an entrance to permit flow of fluid into the housing and an exit to permit said fluid to flow out of the housing. A first member is disposed in the housing and defines at least one first passageway. A second member is disposed in the housing and defines at least one second passageway. The first member and the second member are disposed in the housing operatively between the entrance and the exit so that the at least one first passageway and the at least one second passageway are selectively positionable with respect to each other to allow passage of the fluid through the at least one first passageway and the at least one second passageway from the entrance to the exit. A check valve is disposed in the housing operatively between the entrance and the first and second members. The check valve is configured to permit fluid flow from the entrance to the first and second members and to prevent fluid flow from the first and second members out of the housing by the entrance.

30 Claims, 3 Drawing Sheets

FLUID VALVE

BACKGROUND OF THE INVENTION

The present invention relates generally to fluid valves, for example valves which may be used to deliver hot and cold water to a common spout.

Compression valves are often used to control fluid flow, for example water flow, from a fluid source to a fluid outlet. In such valves used in water fixtures, a stem is moved axially to open and shut the valve to allow passage of water from a water source to a water outlet. A flange is often provided at the end of the stem to prevent passage of water back through the valve when the valve is open.

Such compression valves may be advantageous when the water outlet includes a squeeze nozzle commonly fed by a pair of valves. Typically, the separate valves respectively control the flow of water from a hot water source and a cold water source to the common squeeze nozzle. In this arrangement, the valves are normally left open to some degree so that water under pressure is always delivered to the nozzle, and water flow is activated by the squeeze nozzle. Since the valves share a common water outlet, if water pressure in one of the water lines is greater than the pressure in the other, water from the higher pressure line may force its way through the other valve into the lower pressure line.

The flange on a compression valve stem, which permits passage of water out through the valve but not back through, generally prevents the back flow problem. Specifically, if water from the higher pressure line is forced back through the other open valve, the reverse water flow moves the flange to block the valve entrance and prevents water flow back into the lower pressure line.

Shear valves may also be used in such water flow systems. In a typical shear valve, abutting flat circular plates are disposed in a cylindrical housing and rotate with respect to each other. The plates have openings which, depending on the rotational position of the plates, may align to allow water passage from the valve's entrance to its exit. Rotation of the plates in a closing direction, however, blocks water passage. A stem is attached to one of the plates so that rotation of the stem rotates the plate with respect to the other plate, which is rotationally fixed with respect to the housing.

Unlike the compression valves described above, shear valves generally do not have a mechanism to prevent reverse water flow through the valve when the valve is open. Accordingly, a check valve may be installed in the water line upstream from the shear valve. Alternatively, if a shear valve is to be retrofit into a fixture originally equipped with a compression valve, the water line may be cut to permit check valve installation.

SUMMARY OF THE INVENTION

The present invention recognizes and addresses the foregoing considerations, and others, of prior art constructions and methods.

Accordingly, it is an object of the present invention to provide an improved fluid valve.

It is another object of the present invention to provide a shear valve with an integral check valve.

It is a still further object of the present invention to provide a shear valve having an improved sealing arrangement.

These and other objects are achieved by a fluid valve including a housing having an entrance to permit flow of fluid into the housing and an exit to permit the fluid to flow out of the housing. A first member is disposed in the housing and defines at least one first passageway. A second member is disposed in the housing and defines at least one second passageway. The first member and the second member are disposed in the housing operatively between the entrance and the exit so that the at least one first passageway and the at least one second passageway are selectingly positionable with respect to each other to allow passage of the fluid through the at least one first passageway and the at least one second passageway from the entrance to the exit. A check valve is disposed in the housing operatively between the entrance and the first and second members. The check valve is configured to permit fluid flow from the entrance to the first and second members and to prevent fluid flow from the first and second members out of the housing by the entrance.

In one preferred embodiment, the housing includes a generally cylindrical sleeve in which the first and second members are disposed. The check valve is disposed in an end cap which defines the fluid entrance. The end cap attaches to the sleeve so that the check valve is operatively disposed between the first and second members and the fluid entrance.

In another preferred embodiment, a stem attaches to one of the first and second members at one end and extends out of the valve housing to attach to a handle at the other. A resilient seat assembly is disposed adjacent the first and second members opposite the stem to absorb axial forces transmitted to the first and second members by the stem.

Other objects, features and aspects of the present invention are discussed in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the accompanying figures, in which.

Figure 1:
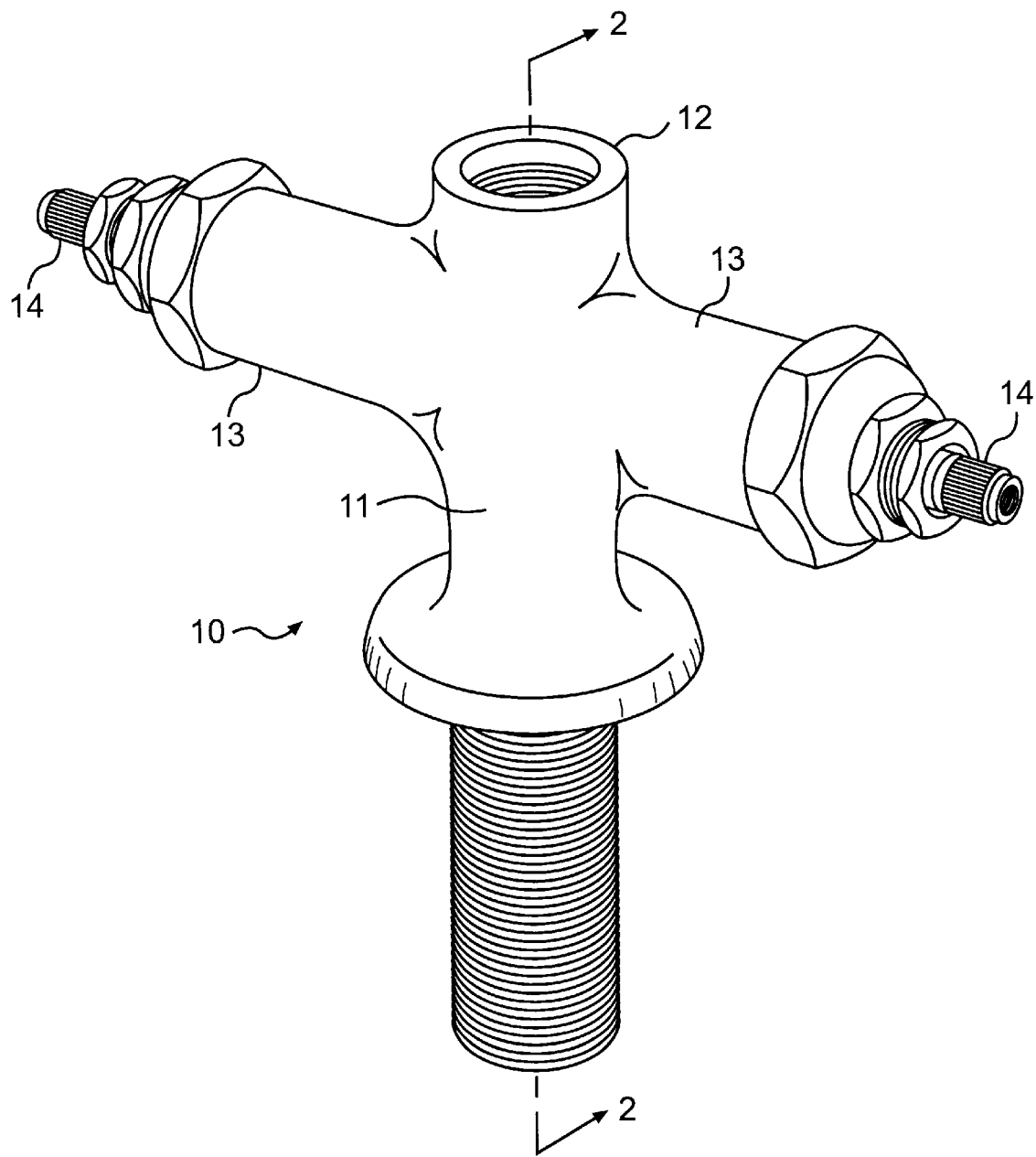
FIG. 1 is a perspective view of an embodiment of a fluid fixture assembly constructed in accordance with the present invention.

Repeat use of reference characters in the present specification and drawings is intended to represent the same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made to the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 2:
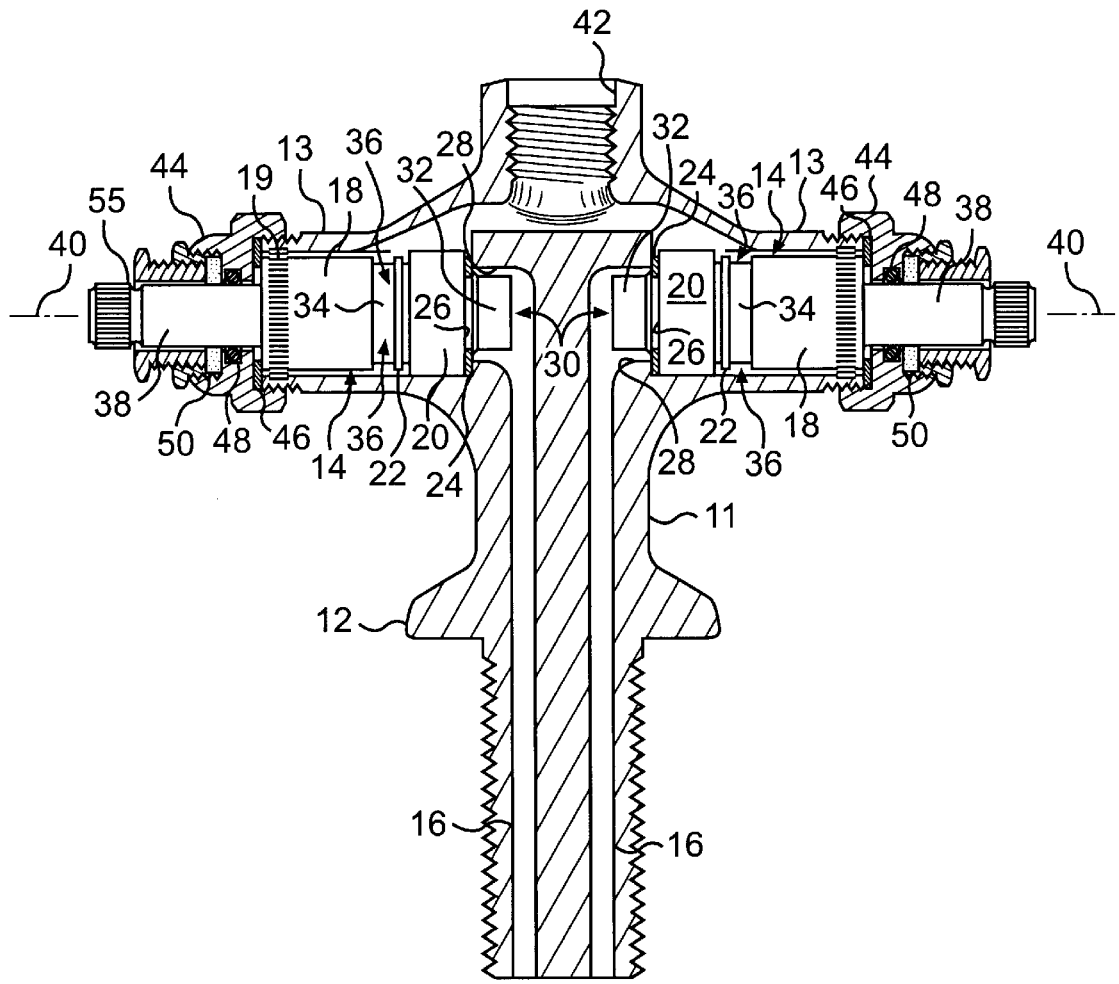
FIG. 2 is a cross-sectional view of the fluid fixture assembly illustrated in FIG. 1 taken along the line 2—2.

Referring to FIG. 1, a water fixture 10 includes a housing 12 having an elongated trunk 11 and radially extending arms 13 in which two shear valves 14 are disposed. Referring to FIG. 2, housing 12 defines two water inlet channels 16 for delivering hot and cold water, respectively, to the valves.

Each valve cartridge 14 includes a generally cylindrical sleeve 18 and an end cap 20. Each sleeve 18 includes teeth 19 disposed about its outer circumferential surface to interact with opposing teeth on the inner diameter of arms 13 to maintain the valve in a fixed rotational position with respect to the fixture housing. In a preferred embodiment, sleeve 18 and end cap 20 are constructed from a hard plastic material.

End cap 20 includes an annular ridge (not shown) extending radially inward from the inner diameter of the cap proximate the cap end receiving an end 22 of sleeve 18. This ridge is received by an opposing annular groove (not shown) extending about the outer circumferential surface of sleeve 18 proximate end 22. The open end of the end cap and/or the sleeve end 22 deform slightly as the ridge passes onto sleeve end 22 until the ridge reaches the circumferential groove. The ridge and groove are configured to mate with each other so that the ridge is received by the groove to secure the end cap to the sleeve in the axial direction.

It should be understood that various other "snap-type" locking mechanisms may be employed to secure the end cap to the sleeve. For example, one or more individual teeth extending from the inner diameter of the end cap may be used instead of a continuous ridge. Furthermore, in contrast to the above-described arrangement, the male component of the locking mechanism may be included on the sleeve, with the female component being included on the end cap. Moreover, it should be understood that various suitable mechanisms may be employed to mate the sleeve to the end cap, for example threads, press-fits, bondings and snap-rings.

An annular seal 24 sits on a shoulder 26 disposed about the fluid entrance at each end cap 20 and has an inner diameter less than, and an outer diameter greater than, the opening 28 of the respective water inlet channel 16. Thus, when valve cartridge 14 are secured into housing 12, seals 24 prevent water flow from water inlet channels 16 out of opening 28 except through the valves.

Water enters the housing of each valve from the respective water inlet channel 16 through an axial hole (indicated by arrows 30) in extensions 32 of end cap 20. Each sleeve 18 includes a depression 34 defining a pair of outlets 36 extending through the sleeve wall. As described in more detail below, water flow through each valve from the entrance 30 to the exit outlets 36 may be permitted or prevented by actuation of a valving mechanism including a stem 38. More specifically, rotation of each stem 38 about the valve axis 40 can actuate the valving mechanism from a closed position, where water flow from the entrance 30 to the exit outlets is blocked, to an open position in which such flow is permitted, and vice versa. Various open positions are possible, and varying the open position controls the water flow rate out of the outlets. Water From the exit outlets 36 flows to a fixture outlet 42 which may attach to, for example, a squeeze nozzle.

Each valve cartridge 14 is secured in housing 12 by a respective nut 44 which threads onto an arm 13 as shown in FIG. 2. A washer 46 holds the valve axially in the housing arm and seals the threaded interface between the arm and the nut to prevent water leakage when the valve is open. Further sealing is provided by an O-ring 48 and a washer 50.

The water fixture housing assembly illustrated in FIG. 2 is provided by way of example only. Accordingly, it should be understood by those of ordinary skill in the art that any suitable fixture assembly may be employed within the scope and spirit of the present invention.

Figure 3:
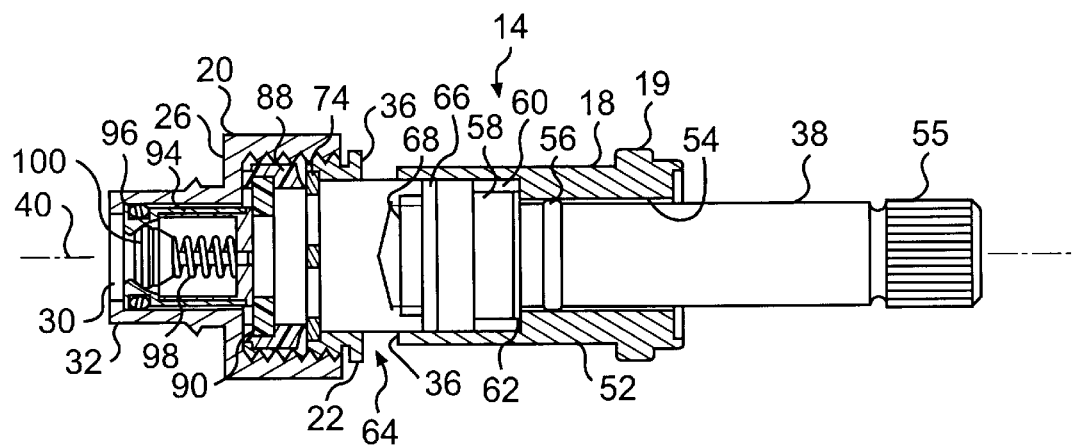
FIG. 3 is a cross-sectional view of an embodiment of a fluid valve constructed in accordance with the present invention.
Figure 4:
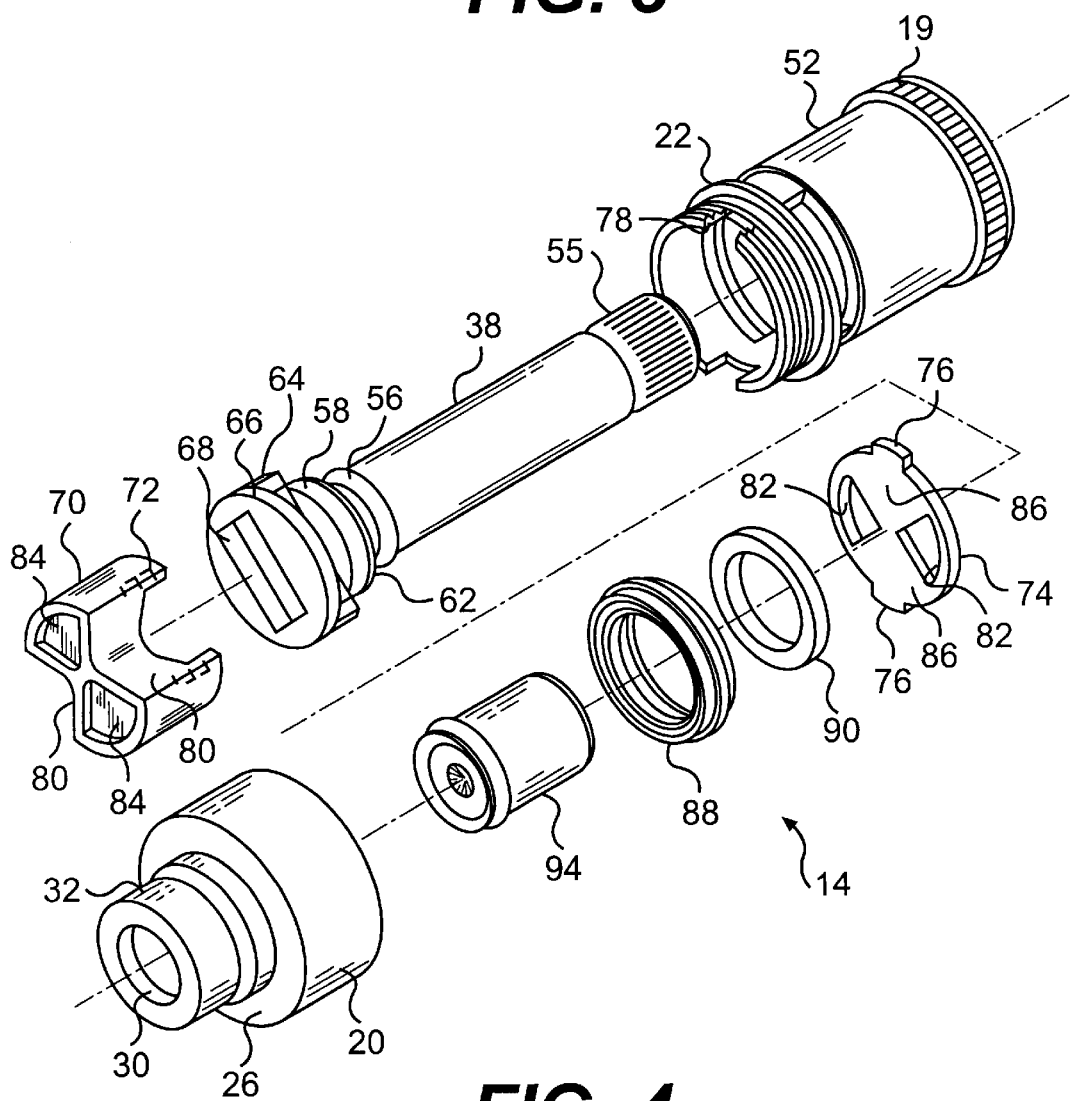
FIG. 4 is an exploded view of the fluid valve illustrated in FIG. 3.

A second embodiment of a valve 14 constructed in accordance with the present invention is illustrated in FIGS. 3 and 4. The valve 14 is the same as the valve of FIG. 2 except for the construction of the valve cartridge housing. The FIGS. 3 and 4 valve housing, which includes sleeve 18 and end cap 20, are constructed of a metallic material, for example brass. Further, the end cap is attached to the sleeve through a threaded engagement rather than through a snap-type locking mechanism.

Sleeve 18 includes a forward end 52 and a rearward end 22. Forward end 52 includes an axial bore 54 for receiving stem 38. Stem 38 includes an axially forward end 55 which is splined to receive a handle. An O-ring 56 is disposed on stem 38 in bore 54 to prevent water leakage from the forward end of the valve housing. A cylindrical portion 58 extends radially outward from the forward section of stem 38 and sits on washer 62 on the forward wall of the generally cylindrical counterbore 60. An elongated flange portion 64 extends rearward from cylindrical portion 58 and across the counterbore just inward of the counterbore wall. Flange 64 rotates about valve axis 40 and engages stops (not shown) provided on the counterbore inner wall as stem 38 is rotated so that rotation of the stem is limited to a 90° arc.

Stem 38 ends in a disc 66 and a key 68 extending rearward from the disc. A first ceramic plate 70 sits on disc 66 and receives key 68 in a slot 72 so that stem 38 rotationally drives first ceramic plate 70 about axis 40. A second ceramic plate 74 abuts first ceramic plate 70 and is fixed rotationally with respect to sleeve 18 by tabs 76 received by slots 78 in sleeve end portion 22.

Ceramic plates 70 and 74 are disposed operatively between entrance 30 and exit outlets 36. That is, they are disposed in the water flow path between the entrance and exit to selectively prevent and permit water flow from the entrance to the exit. For example, first ceramic plate 70 includes a pair of symmetrical passageways 80, and second ceramic plate 74 includes a pair of symmetrical passageways 82, extending axially through the generally cylindrical plates. Passageways 80 open through the circumferential surface of cylindrical plate 70 so that they may communicate with exit outlets 36.

The stops (not shown) on the counterbore inner walls are disposed so that when stem 38 is at one extreme of its 90° rotational arc, passageways 82 are aligned with solid portions 84 of first plate 70 and passageways 80 are aligned with solid portions 86 of second plate 74. In this closed position, the passageways 82 and 80 are misaligned. Accordingly, water entering the valve through entrance 30 is prevented from passing to exit outlets 36.

The passageways are selectively positionable with respect to each other. For example, rotation of stem 38 rotates passageways 80 with respect to passageways 82, which remain rotationally fixed with respect to the housing axis 40. As stem 38 is rotated away from the closed position, water is increasingly permitted to pass through the passageways to the exit outlets 36. When flange 64 reaches the counterbore stop at the opposite extreme of its 90° arc, passageways 82 are fully aligned with corresponding passageways 80, and the valve is in a fully open position.

The construction and operation of shear valves should be well understood by those of ordinary skill in the art. Accordingly, it should be understood that various suitable constructions are possible and that the plates may be made of any suitable material, for example including ceramics such as aluminum oxides and zirconium oxides.

Second ceramic plate 74 is held axially in place through a slight adherence to first ceramic plate 70 and by a resilient seat assembly including an outer seal portion 88 and an inner washer 90. In one preferred embodiment, outer seal portion 88 is constructed of a resilient rubber-like material that sits on the inner wall of shoulder 26 of end cap 20 and extends axially forward to sealingly engage second ceramic plate 74. Thus, a sealed fluid path is defined from the shoulder to plate 74.

Washer 90, which may be a DELRIN washer, is a rigid or semi-rigid washer to maintain the annular shape of outer seal portion 88 and, as described in more detail below, to prevent axial movement of a check valve from end cap extension 32. Outer seal portion 88 prevents water leakage from the connection between end cap 20 and sleeve 18.

The end cap seal also acts as a shock absorber for the valving mechanism. For example, if an axial blow is delivered to the forward end 55 of stem 38, the force is transferred to resilient outer seal portion 88, which absorbs the force and cushions the valving mechanism to prevent damage to the ceramic plates. In this regard, a resilient seat may be placed between the axial interface between the stem and the plates, for example between disc 66 and plate 70.

A check valve assembly is secured within end cap extension 32 by an interference fit between an O-ring 96, which is held in an outer circumferential groove in a check valve housing 94, and the inner diameter of end cap extension 32. The check valve is disposed operatively between the entrance 30 and the ceramic plates. That is, it is disposed in the water flow path so that the check valve may prevent water flow from the plates to the fluid entrance. The check valve includes a spring 98 biasing a sealed plunger 100 axially rearward to block entrance 30. The pressure in water lines normally connected to inlet channels 16 (FIG. 2), however, overcomes the biasing force and moves the plunger axially forward to permit water flow into end cap 20 to second ceramic plate 74. If water is forced through the valve in the reverse direction (from exit outlets 36 toward entrance 30), the reverse water flow moves plunger 100 axially rearward to block entrance 30 and prevent water flow into the upstream water inlet channel 16 (FIG. 2) and connecting water line.

The check valve housing 94 is provided so that the check valve may be easily removed from the end cap for replacement. It should be understood, however, that various constructions of the check valve assembly and check valve housing are possible. For example, the check valve housing may be omitted, and the check valve components may comprise various suitable configurations. The check valve may be installed in the main body of the end cap, avoiding the need for extension 32.

Washer 90, being axially secured to the valve housing, provides an additional axial support should water pressure move the check valve axially forward. Specifically, the washer inner diameter is smaller than the outer diameter of the check valve.

It will be apparent to those skilled in the art that various modifications and variations can be made in the present invention without departing from the scope or spirit of the invention. For example, features illustrated or described as part of one embodiment may be used in another embodiment to yield a still further embodiment. It is intended that the present invention cover such modifications and variations as come within the scope of the appended claims.

What is claimed is:

1. A fluid valve cartridge, said valve cartridge comprising:
   a self-contained cartridge housing configured to be received by a water fixture and having an entrance to permit flow of fluid into said housing and an exit to permit said fluid to flow out of said housing;
   a first member defining at least one first passageway;
   a second member defining at least one second passageway,
   said first member and said second member being disposed in said housing operatively between said entrance and said exit so that said at least one first passageway and said at least one second passageway are selectively positionable with respect to each other to allow passage of said fluid through said at least one first passageway and said at least one second passageway from said entrance to said exit;
   a check valve disposed in said housing operatively between said entrance and said first and second members, said check valve being configured to permit fluid flow from said entrance to said first and second members and to prevent fluid flow from said first and second members out of said housing by said entrance; and
   a retainer axially secured to said housing operatively between said check valve and said first and second members to prevent axial movement of said check valve to said first and second members.

2. A valve cartridge as in claim 1, wherein each of said first member and said second member comprises a cylindrical plate.

3. A valve cartridge as in claim 2, wherein said at least one first passageway extends axially through said first member and said at least one second passageway extends axially through said second member.

4. A valve cartridge as in claim 3, wherein said housing defines a generally cylindrical interior area and wherein said first member and said second member are disposed within said housing coaxially with respect to said generally cylindrical area.

5. A valve cartridge as in claim 4, wherein one of said first member and said second member is disposed in said housing in a rotationally fixed position with respect to the axis of the housing and wherein the other of said first member and said second member is disposed in said housing in a rotatable position with respect to said housing axis.

6. A valve cartridge as in claim 5, wherein said at least one first passageway and said at least one second passageway are configured so that rotation of said one of said first member and said second member to a first position, in which said at least one first passageway is aligned with said as least one second passageway, permits passage of said fluid through said first member and said second member and rotation of said one of said first member and said second member to a second position, in which said at least one first passageway is misaligned with said at least one second passageway, prevents said fluid passage.

7. A valve cartridge as in claim 6, wherein said first member includes two said first passageways symmetrically disposed through said first member and wherein said second member includes two said second passageways symmetrically disposed through said second member, each said first passageway being aligned with a respective one of said second passageways when said one of said first member and said second member is in said first position.

8. A valve cartridge as in claim 1, wherein said first member and said second member are disposed in said housing so that said first member abuts said second member.

9. A valve cartridge as in claim 1, including a resilient seat assembly disposed in said housing in operative communication with said first and second members to absorb forces applied to at least one of said first and second members.

10. A valve cartridge as in claim 9, wherein said resilient seat assembly is disposed operatively between said entrance and said first and second members.

11. A valve cartridge as in claim 1, wherein said retainer comprises an annular ring and wherein said annular ring has an inner diameter less than the outermost width of said check valve.

12. A valve cartridge as in claim 1, wherein said housing includes a generally cylindrical sleeve and an end cap attached coaxially to said sleeve.

13. A valve cartridge as in claim 12, wherein said entrance is defined by said end cap, wherein said exit is defined by said sleeve, and wherein said check valve is disposed in said end cap.

14. A valve cartridge as in claim 13, wherein each of said first member and said second member comprises a generally cylindrical plate coaxially disposed in said sleeve, wherein said end cap includes a shoulder disposed perpendicularly to the axis of said housing, and wherein said valve includes a resilient seat assembly extending from said shoulder to engage one of said first member and said second member to absorb axial forces applied to said one of said first member and said second member.

15. A valve cartridge as in claim 14, including an elongated stem coaxial with and extending into said sleeve from an end of said sleeve opposite said end cap, said stem being attached to the other of said first member and said second member so that said stem rotationally drives said other of said first member and said second member, and said resilient seat assembly being configured to absorb axial forces applied to said first member and said second member by said stem.

16. A valve cartridge as in claim 12, wherein said first member and said second member are disposed in said sleeve.

17. A valve cartridge as in claim 16, wherein said end cap is attached to said sleeve so that said end cap secures at least one of said first member and said second member in an axial direction with respect to said housing.

18. A valve cartridge as in claim 12, wherein said end cap is threadedly attached to said sleeve.

19. A valve cartridge as in claim 1, wherein said retainer is rigid or semi-rigid and is removably secured to said housing between said check valve and said first and second members.

20. A valve cartridge as in claim 19, wherein said retainer comprises an annular ring and wherein said annular ring has an inner diameter less than the outermost width of said check valve.

21. A fluid valve cartridge, said valve comprising:
a housing having an entrance to permit flow of fluid into said housing and an exit to permit said fluid to flow out of said housing;
a first member defining at least one first passageway;
a second member defining at least one second passageway,
said first member and said second member being disposed in said housing operatively between said entrance and said exit so that said at least one first passageway and said at least one second passageway are selectively positionable with respect to each other to allow passage of said fluid through said at least one first passageway and said at least one second passageway from said entrance to said exit;
a check valve disposed in said housing operatively between said entrance and said first and second members, said check valve being configured to permit fluid flow from said entrance to said first and second members and to prevent fluid flow from said first and second members out of said housing by said entrance; and
a resilient seat assembly disposed in said housing operatively between said entrance and said first and second members in operative communication with said first and second members to absorb forces applied to at least one of said first and second members,
wherein said resilient seat assembly includes a resilient annular portion operatively disposed between said check valve and said first and second members, said resilient annular portion sealingly engaging one of said first member and said second member to provide a sealed fluid path from said check valve to said one of said first member and said second member,
wherein said resilient seat assembly includes a rigid or semi-rigid annular member and wherein said resilient annular portion is disposed about the outer circumference of said rigid or semi-rigid annular member.

22. A fluid valve cartridge, said valve cartridge comprising:
a self-contained cartridge housing configured to be received by a water fixture and defining a generally cylindrical interior area having an entrance to permit flow of fluid into said housing and an exit to permit said fluid to flow out of said housing;
a first generally cylindrical plate disposed in said housing operatively between said entrance and said exit, said first plate defining at least one first passageway;
a second generally cylindrical plate disposed in said housing operatively between said entrance and said exit and abutting said first plate, said second plate defining at least one second passageway,
wherein at least one of said first plate and said second plate is rotatable with respect to the other of said first plate and said second plate to position said at least one first passageway and said at least one second passageway with respect to each other to allow passage of said fluid through said at least one first passageway and said at least one second passageway from said entrance to said exit;
a check valve disposed in said housing operatively between said entrance and said first and second plates, said check valve being configured to permit fluid flow from said entrance to said first and second plates and to prevent fluid flow from said first and second plates out of said housing by said entrance; and
a resilient seat assembly disposed in said housing between said entrance and said first and second plates in operative communication with said first and second plates to absorb forces applied to at least one of said first and second plates,
wherein said resilient seat assembly includes a resilient annular portion sealingly engaging one of said first plate and said second plate to provide a sealed fluid path from said check valve to said one of said first plate and said second plate and also includes a rigid or semi-rigid retainer restrained from axial movement to said one of said first plate and said second plate by said resilient annular portion to prevent axial movement of said check valve to said one of said first plate and said second plate.

23. A valve cartridge as in claim 22, wherein said housing includes a generally cylindrical sleeve defining said exit and includes an end cap attached coaxially to said sleeve and defining said entrance, wherein said check valve is disposed in said end cap, and wherein said first plate and said second plate are disposed in said sleeve.

24. A valve cartridge as in claim 23, wherein said end cap is threadedly attached to said sleeve.

25. A valve cartridge as in claim 23, wherein said end cap includes a shoulder disposed perpendicularly to said axis, and wherein said resilient seat assembly extends from said shoulder to engage said one of said first plate and said second plate.

26. A valve as in claim 25, wherein said resilient seat assembly includes a resilient annular portion seated on said shoulder and sealingly engaging one of said first plate and said second plate to provide a sealed fluid path from said check valve to said one of said first plate and said second plate.

27. A valve cartridge as in claim 22, wherein said resilient annular portion is disposed about the outer circumference of said rigid or semi-rigid retainer.

28. A valve cartridge as in claim 22, wherein said second plate is rotationally fixed with respect to said axis and wherein said resilient annular portion sealingly engages said second plate.

29. A fluid fixture, said fixture comprising:

a housing including at least one fluid path and at least one fluid outlet; and at least one valve cartridge disposed in said housing, each said valve cartridge including a self-contained valve cartridge housing having an entrance in communication with a said fluid path to permit flow of fluid into said valve housing and an exit in communication with a said outlet to permit said fluid to flow out of said valve housing to said outlet, a first member defining at least one first passageway, a second member defining at least one second passageway, said first member and said second member being disposed in said valve housing operatively between said entrance and said exit so that said at least one first passageway and said at least one second passageway are selectively positionable with respect to each other to allow passage of said fluid through said at least one first passageway and said at least one second passageway from said entrance to said exit, and a check valve disposed in said valve housing operatively between said entrance and said first and second members, said check valve being configured to permit fluid flow from said entrance to said first and second members and to prevent fluid flow from said first and second members out of said valve housing by said entrance, and a retainer axially secured to said housing operatively between said check valve and said first and second members to prevent axial movement of said check valve to said first and second members.

30. A fixture as in claim 29, wherein said valve housing defines a generally cylindrical interior area, said first member comprises a cylindrical plate through which said at least one first passageway axially extends, said first plate being disposed coaxially in said interior area in a rotatable position with respect to the valve housing axis, said second member comprises a cylindrical plate through which said at least one second passageway axially extends, said second plate being disposed coaxially in said interior area abutting said first plate in a rotationally fixed position with respect to the valve housing axis, and said at least one first passageway and said at least one second passageway are configured so that rotation of said first plate to a first position, in which said at least one first passageway is aligned with said at least one second passageway, permits passage of said fluid through said first plate and said second plate and rotation of said first plate to a second position, in which said at least one first passageway is misaligned with said at least one second passageway, prevents said fluid passage.

* * * * *